US011361326B2

(12) United States Patent
Shoshan

(10) Patent No.: US 11,361,326 B2
(45) Date of Patent: Jun. 14, 2022

(54) DISTRIBUTED MACHINE LEARNING DECENTRALIZED APPLICATION PLATFORM

(71) Applicant: SAP SE, Walldorf (DE)

(72) Inventor: Itzhak Shoshan, Even Yehuda (IL)

(73) Assignee: SAP SE, Walldorf (DE)

( * ) Notice: Subject to any disclaimer, the term of this patent is extended or adjusted under 35 U.S.C. 154(b) by 782 days.

(21) Appl. No.: 16/219,329

(22) Filed: Dec. 13, 2018

(65) Prior Publication Data

US 2020/0193451 A1     Jun. 18, 2020

(51) Int. Cl.
*G06N 20/00* (2019.01)
*G06Q 30/02* (2012.01)
*G06N 5/04* (2006.01)

(52) U.S. Cl.
CPC ............ *G06Q 30/02* (2013.01); *G06N 5/04* (2013.01); *G06N 20/00* (2019.01)

(58) Field of Classification Search
None
See application file for complete search history.

(56) References Cited

U.S. PATENT DOCUMENTS

| 7,970,829 | B2 | 6/2011 | Shoshan |
| 9,576,480 | B1 | 2/2017 | Shoshan |
| 9,671,237 | B1 | 6/2017 | Eliassi et al. |
| 9,930,026 | B2 | 3/2018 | Shoshan |
| 2014/0006075 | A1 | 1/2014 | Shoshan et al. |
| 2016/0203522 | A1* | 7/2016 | Shiffert ................. H04L 67/104 705/14.58 |
| 2018/0047074 | A1* | 2/2018 | Cronin .................... G06Q 30/04 |
| 2020/0037158 | A1* | 1/2020 | Soundararajan ...... H04L 9/3239 |
| 2020/0134656 | A1* | 4/2020 | Padmanabhan ..... H04L 63/0815 |

* cited by examiner

*Primary Examiner* — David R Vincent
(74) *Attorney, Agent, or Firm* — Fish & Richardson P.C.

(57) ABSTRACT

A request for an inference from a customer is received at a machine learning (ML) decentralized application (DAPP) platform, where the request includes a data record associated with a user that is associated with the customer. The data record is distributed by the ML DAPP platform among a number of service providers. An inference is received at the ML DAPP platform from each service provider. The received inferences are returned to the customer by the ML DAPP platform.

20 Claims, 4 Drawing Sheets

DISTRIBUTED MACHINE LEARNING DECENTRALIZED APPLICATION PLATFORM

BACKGROUND

Machine learning is a subset of data science that uses statistical models to draw insights and to make predictions. To facilitate data exchange and cooperation, different parties may work together to establish a machine-learning model. Machine learning techniques can be used for developing a training mode, or providing a personalized inference for a user. Traditional machine learning projects use an on premise computer or rely on cloud-computing solutions. However, traditional machine learning solutions require that large amounts of computational resources be made available by the user.

SUMMARY

The present disclosure describes methods and systems, including computer-implemented methods, computer program products, and computer systems for a distributed machine learning (ML) decentralized application (DAPP) platform.

In an implementation, a request for an inference from a customer is received at a machine learning (ML) decentralized application (DAPP) platform, where the request includes a data record associated with a user that is associated with the customer. The data record is distributed by the ML DAPP platform among a number of service providers. An inference is received at the ML DAPP platform from each service provider. The received inferences are returned to the customer by the ML DAPP platform.

The described subject matter can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented to realize one or more of the following advantages. First, the proposed platform utilizes a number of computing devices (for example, high-performance video gaming consoles) that have both high computational power and are low-cost. Second, the computing devices envisioned for use by the proposed platform are connected to one or more secure networks and are therefore tamper-proof, which prevents data leakage and malicious activities by third-parties. Third, there exists a large number of available computing devices for the proposed platform, providing a highly-scalable architecture.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

Like reference numbers and designations in the various drawings indicate like elements.

DETAILED DESCRIPTION

Figure 1:
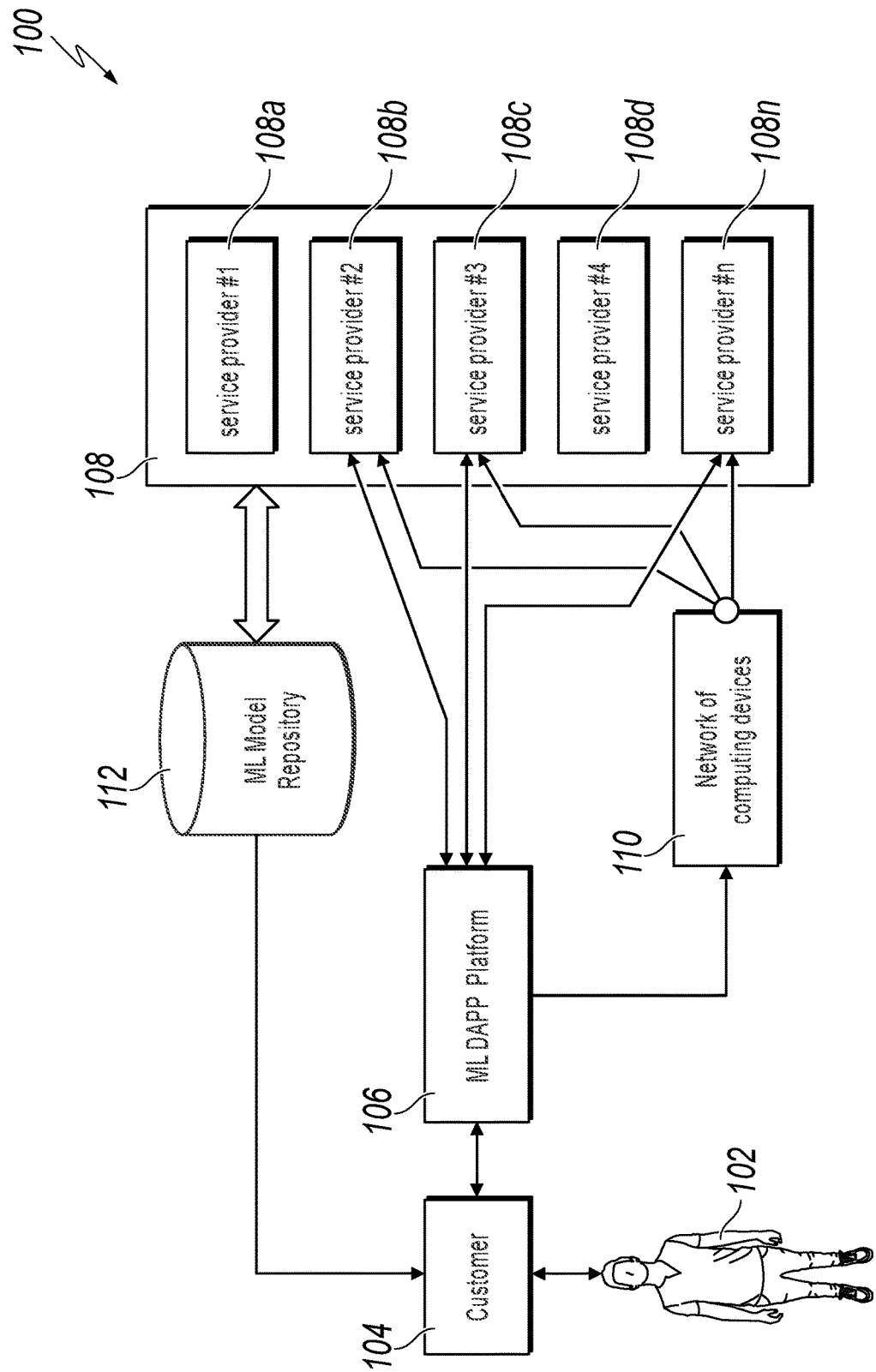
FIG. 1 is an example diagram illustrating the system environment of a thin machine learning (ML) decentralized application (DAPP) platform, according to some implementations of the present disclosure.

The following detailed description describes a distributed machine learning (ML) decentralized application (DAPP) platform and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

ML is becoming more and more common for entities (for example, enterprises or organizations) to train models and to provide services. For example, through recurrent neural networks (RNN) or long short-term memory (LSTM) networks, requestors (for example, consumers) can interact with talking bots through writing (for example, typing on a keyboard or touchscreen) or talking (for example, making voice inputs). Further, logistic regression models can be used in predicting personalized pricing, where each consumer can see a personal price or customized purchase recommendations based on a personal profile and current state. In this way, retailers can automatically recognize consumers and present personalized offers to the consumers by using convolutional neural networks (CNN).

It is foreseeable that the adoption of mixed reality/augmented reality scenarios may require multiple real-time inferences/predictions during customer interactions with retailers and other offer providers. However, this type of functionality requires a large amount of inferences (that is, predictions) with no (or substantially no) perceivable latency to enable as seamless a customer experience as possible.

Current solutions rely on premise computation or cloud computing solutions. For example, some entities (such as, larger-sized enterprises or organizations) can purchase and self-host costly servers to train ML models. In some cases, entities rent computational power from cloud-computing vendors such as AMAZON, GOOGLE, MICROSOFT, and NVIDIA. However, neither the centralized cloud-computing-based solution nor the on premise solution is able to satisfy necessary computational requirements due to network latency and relatively low computing power availability when compared to needed computing power. It is also not economical for each location to run its own computation infrastructure for the MLs. For example, the cloud-computing solutions offered by cloud-computing vendors have relatively higher latency and higher cost. On the other hand, although on premise devices can offer relatively low latency, they are expensive to operate and maintain. Therefore, techniques to establish a new computing, data, and network architecture to support the needs for ML predictions are desired.

This disclosure describes a distributed ML DAPP platform that leverages a large amount of underutilized computational power. Specifically, the described ML training platform identifies local computational power (that is, a number of service providers) that can fulfill a transaction under predefined conditions related to a particular user (such as, price, quality, and service level agreement (SLA)). In order to meet the predefined conditions, each service provider uses a prediction algorithm to determine which to load onto an ML model to the memory to shorten the inference execution time. The service providers can be dedicated computing devices that are located at strategic locations or any under-utilized computational power (for example, SONY PLAYSTATION 4 (PS4), gaming computer, parked autonomous vehicle, or smart mobile device). As such, by using the ML DAPP platform, retailers can offer dynamic personalized pricing to customers based on their particular profiles.

Currently, all customers are expected to pay the same price for the same product at the same store. The proposed solution proposes a method enabling each retailer to offer personalized offerings to each particular customer. For example, in one scenario, a person wearing mixed-reality (MR)/augmented-reality (AR) glasses walks into a shopping mall. The MR/AR glasses can be equipped with a camera facing to the front that takes images of offerings that the person is looking at. After a short while, the person stands in front of a sporting equipment shop and receives a personalized message appearing just for that person in their MR/AR glasses suggesting to surprise their spouse with new yoga outfit for their next morning training session that is scheduled in a calendar. In another scenario, where two customers shop for vacation packages online using two different browsers, each customer can receive a different pricing and recommended vacation bundle on travel sites based on their browsing history.

FIG. 1 is an example diagram illustrating a system 100 of a thin ML DAPP platform, according to some implementations of the present disclosure. As illustrated in FIG. 1, the system 100 includes a user 102 (for example a shopper or other user). In the case of a shopper, user 102 can represent a shopper who shops in store or online and wishes to make a behavioral-type purchase, including personalized pricing or personalized product recommendations. The system 100 also includes a customer 104 (for example, a retailer, a store, a website, or any host that offers products or services for sale).

The system 100 includes an ML DAPP platform 106, which can be provided by an application service provider (for example, SAP or other application service provider). In some implementations, the ML DAPP platform 106 can provide real-time (or substantially real-time) inferences for the user 102. In some implementations, the ML DAPP platform 106 can also develop a training model for the customer 104. The ML DAPP platform 106 is connected with a network of computing devices 110, which is connected with a number of service providers 108 (as illustrated by 108a-108n in FIG. 1).

In some implementations, the network of computing devices 110 can be a computing platform that provides one or more services to the computing devices 110. For example, the network of computing devices 110 can be a SONY PS4 gaming network, and in such an example, service providers 108 can be gaming devices connected to the SONY PS4 gaming network. In some particular implementations, the service providers 108 can be gaming devices that have determined unused computational capability. For example, PS4 gaming devices are inherently suitable for implementations in this disclosure because each are configured as high-performance computing engines and are low-cost. The gaming devices can also be configured to be stateless, which makes the gaming device ideal for forming an underutilized, distributed network.

Additionally, most homes having similar gaming devices are connected in asymmetric networks (that is, networks that have a high download volume and a low upload volume). PS4 gaming devices are also tamper-proof, ensuring a very-low probability of data leakage due to malicious activities. For example, SONY currently has approximately 30 million PS4 machines connected to the SONY network, providing a highly-scalable architecture. In some implementations, other devices having computing hardware/software (such as, specialized central processing unit (CPU) or graphics processing unit (GPU) that can be used for fast calculations and possess a lot of available computing power can also be considered to be covered by service providers 108.

In some implementations, the ML DAPP platform 106 and the network of computing devices 110 forms a joint venture, which can be formed by a mutual agreement. In such a joint venture, the ML DAPP platform 106 offers the network of computing devices 110 (for example, each separate device owner) some type of incentive so that the network of computing devices 110 allows the ML DAPP platform 106 to access its network and distribute tasks to service providers 108 in such a network. In some implementations, the network of computing devices 110 can also offer some type of incentive to the service providers 108 within its network so that these service nodes 108 are willing to accept tasks assigned from the ML DAPP platform 106.

In some implementations, each of the service providers 108 is registered in an ML model repository 112, which stores a number of training models. Once a service provider 108 is registered, the ML model repository 112 takes registration messages received from the service providers 108 as input and generates a prediction of a training model that can maximize revenue for the training node. For example, a training model that predicts the most profit for a retailer. The training model is sent to and loaded into the memory of the service provider 108.

In some implementations, to receive optimized results and to better allocate resources, the service providers 108 can upload training models based on a specific time of a day or a specific type of customer 104. For example, if the customer 104 is a retailer, the service providers 108 can upload training models during daytime and within business hours. In another example, if the customer 104 is a security camera, the service providers 108 can upload the training model during nighttime, so that the service provider can load a computer vision model and classify threats (for example, receiving an image of an armed person or a person with a mask that might plan a robbery).

In some implementations, system 100 can be used in a model training scenario, which requires a lot of historical data that is divided into batches and used to train the model in a distributed manner. In operation in the training scenario, the ML DAPP platform 106 is responsible for developing models for the customer 104. The customer 104 first prepares a self-defined model and a data set to train the self-defined model. The self-defined model is a pre-trained model that is not capable of providing accurate inferences. It is constructed from model architecture and some model meta-parameters. During the training process, with the historical data, the model improves its performance and optimizes itself for accurate inferences. For example, the customer 104 has a dataset with 10 million images and wishes to develop a classifier model to classify these images. In some implementations, the self-defined model can be defined on an ML foundation platform related to the customer 104. Both the self-defined model and the data set are sent to the ML DAPP platform 106. Similar to the previously described example, the ML DAPP platform 106 identifies a number of "ready" service providers 108 that are in an underutilized state and ready to accept tasks, and distributes the self-defined model and the data to the "ready" service providers 108. The service providers 108 then compute the task and return the trained model to the customer 104.

In some implementations, the system 100 can be used in an inference scenario, in which the system 100 executes a data record on a pre-trained model and outputs an inference. In such implementations, an inference data record can leverage data from multiple sources (such as, user data, public data, or enterprise data). In operation in the inference scenario, the user 102 initiates the process by making a request for an inference to the customer 104, for example, by browsing on a travel website for a vacation package. The customer 104 then sends a request for the inference to the ML DAPP platform 106. In some implementations, the request includes a data record related to the user 102. The customer 104 is responsible for getting data from all data resources and sending them as a single data record to the service providers in order to receive an inference. The ML DAPP platform 106 then sends an inference quote to the customer 104 based on details associated with the requested inference. In some implementations, the quote can be a fee the ML DAPP platform charges the customer 104 for making such an inference. If the customer 104 accepts the quote, the ML DAPP platform 106 sends the data record to a service provider 108. In this case, the service provider 108 is already registered with the ML model repository 112 (that is, each service provider 108 is in an underutilized state and pre-loaded with a training model). The service provider 108 generates an inference using the training model and based on the received data record. The service provider 108 sends the generated inference back to the ML DAPP platform 106. The customer 104 receives the requested inference from the ML DAPP platform 106 and displays a personalized offering, for example, a customized vacation package to the user 102. In some implementations, the inference returned by the ML DAPP platform 106, and an inference performance generated by the customer 104 can be sent to the ML model repository 112 to further train and update models stored in the ML repository 112.

Figure 2:
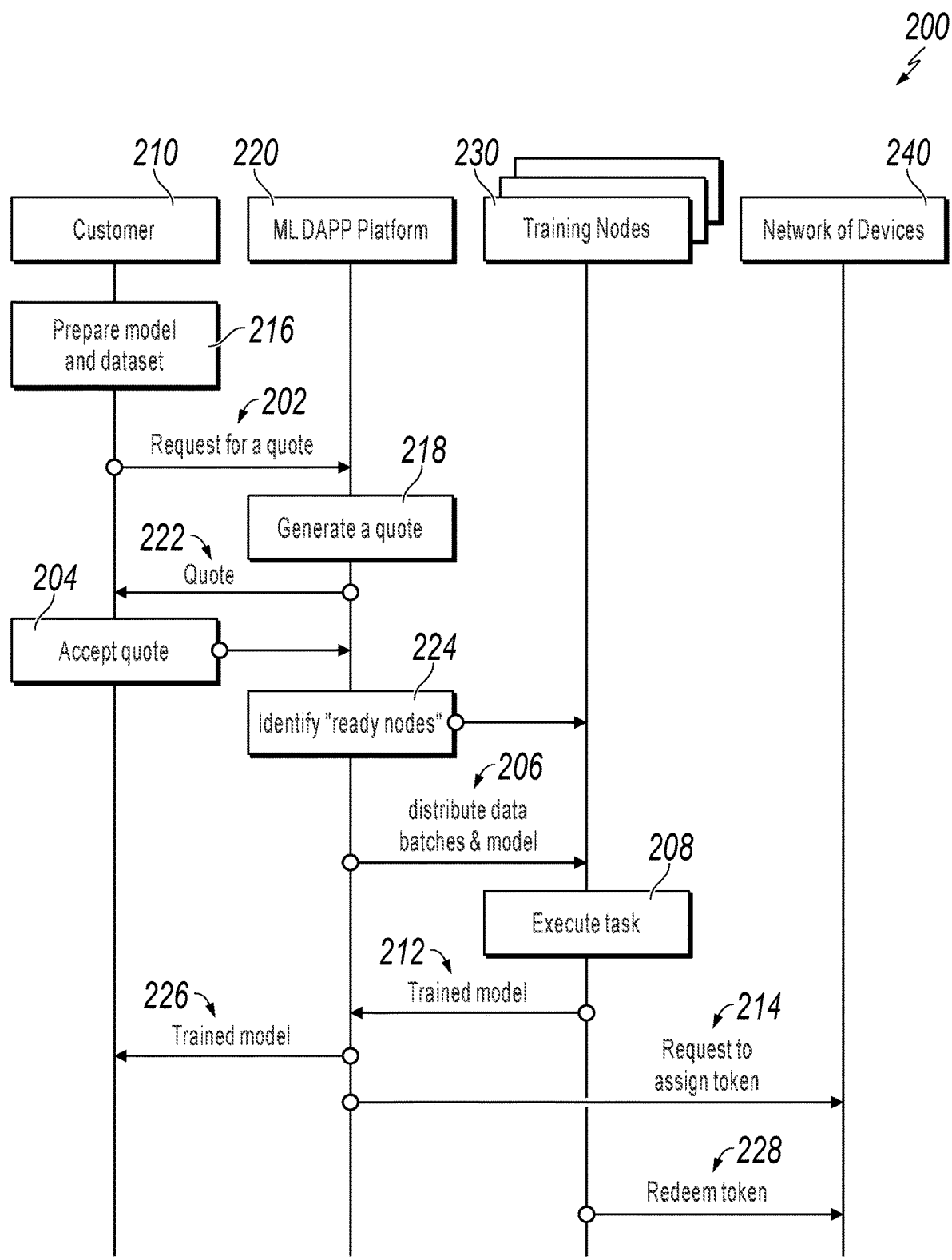
FIG. 2 is a swim diagram illustrating an example process for developing a training model by the ML DAPP platform, according to an implementation of the present disclosure.

FIG. 2 is a swim diagram illustrating an example process 200 for developing a training model by the ML DAPP platform, according to an implementation of the present disclosure. In some implementations, the example process 200 may be performed using one or more computer-executable programs executed using one or more computing devices. For clarity of presentation, the description that follows generally describes method 200 in the context of the other figures in this description. For example, the customer 210 can be the customer 104, the ML DAPP platform 220 can be the ML DAPP platform 106, the training nodes 230 can be the service providers 108, network of devices 240 can be network of computing devices 110, as described with respect to FIG. 1. However, it will be understood that method 200 may be performed, for example, by any suitable system, environment, software, and hardware, or a combination of systems, environments, software, and hardware, as appropriate. In some implementations, various steps of method 200 can be run in parallel, in combination, in loops, or in any order.

At 202, a customer 210 with a need for ML training sends the ML DAPP platform 220 a request for a quote. In some implementations, the quote is for how much the customer 210 is willing to pay for the ML training. In some implementations, the request includes a model and a data set associated with the customer 210.

In some implementations, prior to sending the request for a quote to the ML DAPP platform 220, at 216, customer 210 prepares a model and a data set associated with the customer 210. In some implementations, the customer 210 defines the model on its ML foundation platform and sends it with the data set for training, for example, using an SAP LEONARDO ML FOUNDATION.

At 218, the ML DAPP platform 220 assesses the needs of the customer 210 and generates a quote for the task. In some implementations, the quote includes a cost to the customer that is much less than using a cloud-computing vendor.

At 222, the ML DAPP platform 220 returns the generated quote to the customer 210.

If the customer 210 accepts the quote at 204, the ML DAPP platform 220 is permitted to initiate the ML task (starting at 224)

At 224, the ML DAPP platform 220 identifies "ready" nodes from a number of available training nodes 230. In some implementations, "read" nodes refer to training nodes that have one or more of an idle CPU, sufficient bandwidth and latency, and a security check. In some implementations, training nodes 230 can be gaming devices connected to a network, for example, connected to a SONY PS4 network.

At 206, the ML DAPP platform 220 distributes the ML task to the training nodes 230 that are considered to be ready. In some implementations, the ML DAPP platform 220 divides the received data set into data batches and sends each data batch and the self-defined model to the training nodes 230 that are ready.

At 208, training nodes 230 execute the task to generate a result. In some implementations where the task is ML model training, the training nodes 230 execute the task by training the model using the received data batch.

At 212, the training nodes 230 return the results to the ML DAPP platform 220. In some implementation, the ML DAPP platform 220 can merge all the received results into a final result. Since a trained model requires multiple training iterations, the training results can be merged and applied to the model for the next iteration. The model is trained only after the additional training results don't result in a better model and can generate more accurate inferences.

At 226, the ML DAPP platform 220 returns the final result to the customer 210.

At 214, the ML DAPP platform 220 requests the network of devices 240 to assign tokens to the training nodes 230 that participated in the task. In some implementations, the token is a credit that is much higher than the cost (for example, for electricity) necessary for the training nodes 230 to execute the requested tasks.

At 228, the participating training nodes 230 redeem tokens from the network of devices 240. In some implementations where the training nodes are gaming devices and the network of devices 240 is a gaming platform such as SONY PS4, the network of devices 240 can assign credits to the training nodes 230. For example, and in such implementations, the assigned credits can be used by the training nodes 230 to purchase in-game content/online games, or subscriptions associated with a gaming platform.

Figure 3:
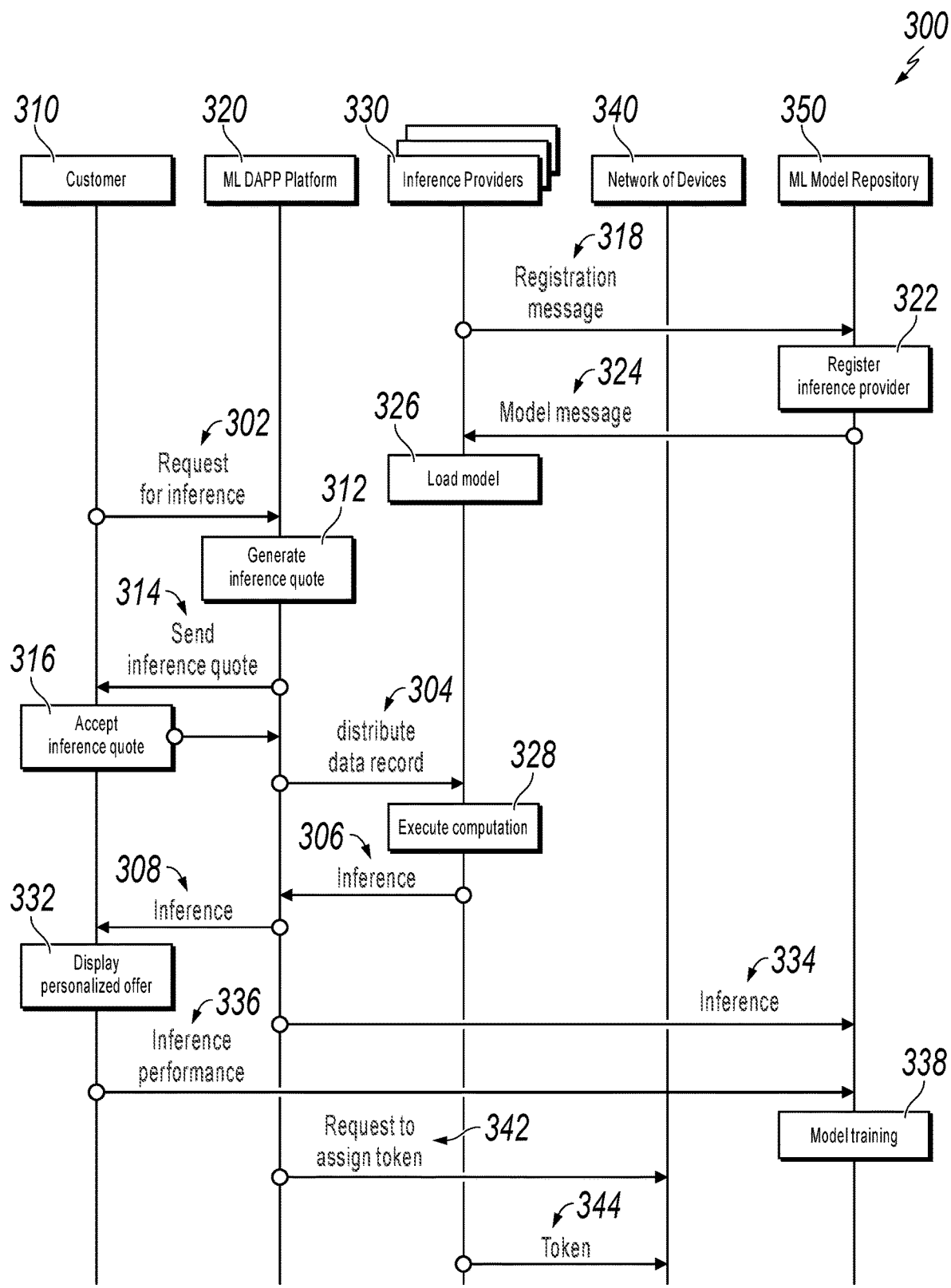
FIG. 3 is a swim diagram illustrating an example process for providing an inference by the ML DAPP platform, according to an implementation of the present disclosure.

FIG. 3 is a swim diagram illustrating an example process 300 for providing an inference by the ML DAPP platform, according to an implementation of the present disclosure. In some implementations, the example process 300 may be performed using one or more computer-executable programs executed using one or more computing devices. For clarity of presentation, the description that follows generally describes method 200 in the context of the other figures in this description. For example, the customer 310 can be the customer 104, the ML DAPP platform 320 can be the ML DAPP platform 106, the inference providers 330 can be the service providers 108, network of devices 340 can be network of computing devices 110, and ML model repository 350 can be the ML model repository 112, as described with respect to FIG. 1. However, it will be understood that method 300 may be performed, for example, by any suitable system, environment, software, and hardware, or a combination of systems, environments, software, and hardware, as appropriate. In some implementations, various steps of method 300 can be run in parallel, in combination, in loops, or in any order.

At 302, the ML DAPP platform 320 receives a request for an inference from a customer 310. In some implementations, the request includes a data record that is associated with a user (not shown in FIG. 3) of the customer 310, for example, the geolocation, gender, age, or occupation of the user. In some implementations, the data record is based on data collected from different recourses, collected from different data resources, such as public data, user data, and enterprise data. In some implementations, the process 300 is initiated by the user to trigger an event, for example, entering a store and picking up products. In some implementations, the inference is a predicted inference for the provided inputs, for example, a personalized pricing for a particular shopper.

At 312, the ML DAPP platform 320 generates an inference quote based, for example, on an evaluation of the received data set.

At 314, the ML DAPP platform 320 returns the inference quote to the customer 310.

At 316, the customer 310 accepts the inference quote if satisfied with the quote. For example, the cost proposed by the quote is much lower than cloud-computing alternative solutions available to provide inferences.

At 304, the ML DAPP platform 320 distributes the data record to each inference provider 330. In some implementations, each inference provider 330 is in an underutilized state.

In some implementations, each of the inference providers 330 belongs to a network of devices 340. In some implementations, prior to distributing the data record to the inference provider 330, each of the inference providers 330 is registered at an ML model repository 350, and the registration process includes steps 318-328.

At 318, the inference providers 330 sends a registration message to the ML model repository 350. In some implementations, prior to sending the registration message, the ML DAPP platform 320 checks whether the inference provider 330 is in an available state. Being in an available state indicates the computing device associated with the inference provider 330 is underutilized and available for inference work. The inference provider 330 can be registered only if it is in the available state.

In some implementations, the registration message includes UID, state, RAM size, ping, duration, or location of the computing device associated with the inference provider 330.

At 322, the ML model repository 350 registers the inference providers 330. In some implementations, the ML model repository 350 takes the registration message as an input and predicts a model that will maximize revenues for the inference provider 330, and then outputs the ML model.

At 324, the ML model repository 350 sends a model message including the model for each registered inference provider 330.

At 326, each inference provider loads the model to its memory.

At 328, each inference provider 330 executes the data record using an ML model from the ML model repository 350 to generate an inference. After 328, the registration process can stops.

At 306, the ML DAPP platform 320 receives an inference from each inference providers 330.

At 308, the ML DAPP platform 320 returns the received inferences to the customer 310.

At 332, the customer 310 presents a personalized offering (based on the inference) to a user.

At 334, the ML DAPP Platform 320 sends the received inferences to the ML model repository 350.

At 336, the customer 310 sends the inference performance to the ML model repository 350. In some implementations, the inference performance includes input, inference, and outcomes to be used for further model training. In some implementations, the customer 310 can store user interaction for model training and use information associated with these interactions for regular model training.

At 338, the ML model registry 350 trains and updates models stored in the repository using the received inference and inference performance. In some implementations, the models stored in the ML model repository 350 can be updated regularly, for example, weekly.

At 342, the ML DAPP platform 320 sends a request to the network of devices 340 to assign a token to each inference provider 330 participated in the process 300.

At 343, each inference provider 330 participated in the process 300 redeems a token from the device of networks 340.

Figure 4:
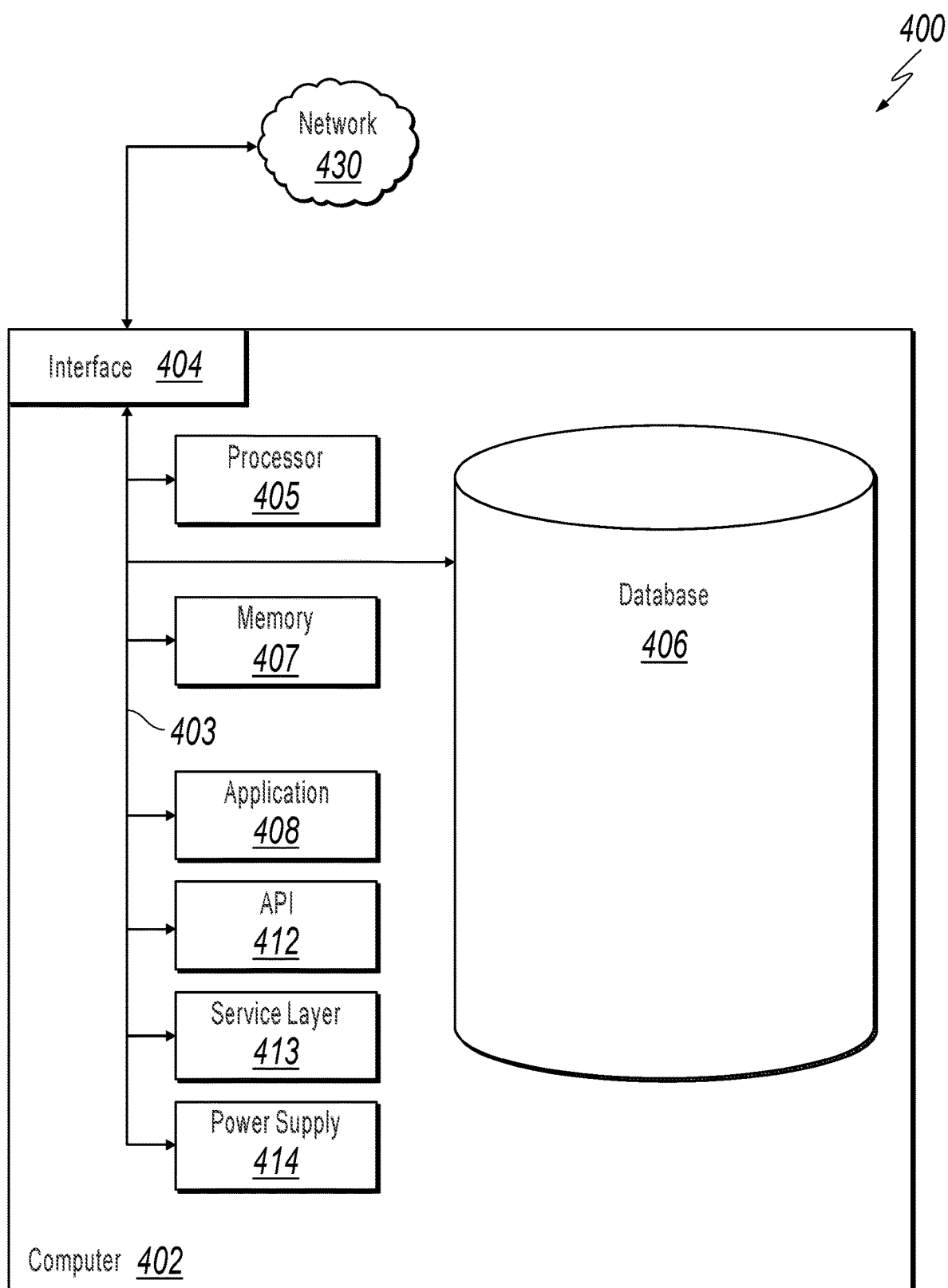
FIG. 4 is a block diagram illustrating an example of a computer-implemented system used to provide computational functionalities associated with described algorithms, methods, functions, processes, flows, and procedures, according to an implementation of the present disclosure.

FIG. 4 is a block diagram illustrating an example of a computer-implemented System 400 used to provide computational functionalities associated with described algorithms, methods, functions, processes, flows, and procedures, according to an implementation of the present disclosure. In the illustrated implementation, System 400 includes a Computer 402 and a Network 430.

The illustrated Computer 402 is intended to encompass any computing device, such as a server, desktop computer, laptop/notebook computer, wireless data port, smart phone, personal data assistant (PDA), tablet computer, one or more processors within these devices, or a combination of computing devices, including physical or virtual instances of the computing device, or a combination of physical or virtual instances of the computing device. Additionally, the Computer 402 can include an input device, such as a keypad, keyboard, or touch screen, or a combination of input devices that can accept user information, and an output device that conveys information associated with the operation of the Computer 402, including digital data, visual, audio, another type of information, or a combination of types of information, on a graphical-type user interface (UI) (or GUI) or other UI.

The Computer 402 can serve in a role in a distributed computing system as, for example, a client, network component, a server, or a database or another persistency, or a combination of roles for performing the subject matter described in the present disclosure. The illustrated Computer 402 is communicably coupled with a Network 430. In some implementations, one or more components of the Computer 402 can be configured to operate within an environment, or a combination of environments, including cloud computing, local, or global.

At a high level, the Computer 402 is an electronic computing device operable to receive, transmit, process, store, or manage data and information associated with the described subject matter. According to some implementations, the Computer 402 can also include or be communicably coupled with a server, such as an application server, e-mail server, web server, caching server, or streaming data server, or a combination of servers.

The Computer 402 can receive requests over Network 430 (for example, from a client software application executing on another Computer 402) and respond to the received requests by processing the received requests using a software application or a combination of software applications. In addition, requests can also be sent to the Computer 402 from internal users (for example, from a command console or by another internal access method), external or third-parties, or other entities, individuals, systems, or computers.

Each of the components of the Computer 402 can communicate using a System Bus 403. In some implementations, any or all of the components of the Computer 402, including hardware, software, or a combination of hardware and software, can interface over the System Bus 403 using an application programming interface (API) 412, a Service Layer 413, or a combination of the API 412 and Service Layer 413. The API 412 can include specifications for routines, data structures, and object classes. The API 412 can be either computer-language independent or dependent and refer to a complete interface, a single function, or even a set of APIs. The Service Layer 413 provides software services to the Computer 402 or other components (whether illustrated or not) that are communicably coupled to the Computer 402. The functionality of the Computer 402 can be accessible for all service consumers using the Service Layer 413. Software services, such as those provided by the Service Layer 413, provide reusable, defined functionalities through a defined interface. For example, the interface can be software written in a computing language (for example JAVA or C++) or a combination of computing languages, and providing data in a particular format (for example, extensible markup language (XML)) or a combination of formats. While illustrated as an integrated component of the Computer 402, alternative implementations can illustrate the API 412 or the Service Layer 413 as stand-alone components in relation to other components of the Computer 402 or other components (whether illustrated or not) that are communicably coupled to the Computer 402. Moreover, any or all parts of the API 412 or the Service Layer 413 can be implemented as a child or a sub-module of another software module, enterprise application, or hardware module without departing from the scope of the present disclosure.

The Computer 402 includes an Interface 404. Although illustrated as a single Interface 404, two or more Interfaces 404 can be used according to particular needs, desires, or particular implementations of the Computer 402. The Interface 404 is used by the Computer 402 for communicating with another computing system (whether illustrated or not) that is communicatively linked to the Network 430 in a distributed environment. Generally, the Interface 404 is operable to communicate with the Network 430 and includes logic encoded in software, hardware, or a combination of software and hardware. More specifically, the Interface 404 can include software supporting one or more communication protocols associated with communications such that the Network 430 or hardware of Interface 404 is operable to communicate physical signals within and outside of the illustrated Computer 402.

The Computer 402 includes a Processor 405. Although illustrated as a single Processor 405, two or more Processors 405 can be used according to particular needs, desires, or particular implementations of the Computer 402. Generally, the Processor 405 executes instructions and manipulates data to perform the operations of the Computer 402 and any algorithms, methods, functions, processes, flows, and procedures as described in the present disclosure.

The Computer 402 also includes a Database 406 that can hold data for the Computer 402, another component communicatively linked to the Network 430 (whether illustrated or not), or a combination of the Computer 402 and another component. For example, Database 406 can be an in-memory or conventional database storing data consistent with the present disclosure. In some implementations, Database 406 can be a combination of two or more different database types (for example, a hybrid in-memory and conventional database) according to particular needs, desires, or particular implementations of the Computer 402 and the described functionality. Although illustrated as a single Database 406, two or more databases of similar or differing types can be used according to particular needs, desires, or particular implementations of the Computer 402 and the described functionality. While Database 406 is illustrated as an integral component of the Computer 402, in alternative implementations, Database 406 can be external to the Computer 402. In some implementations, the Database 406 can hold, among other things, the previously described data for entities such as intents data 416, expressions data 418, skills data 420, and channel connectors data 422.

The Computer 402 also includes a Memory 407 that can hold data for the Computer 402, another component or components communicatively linked to the Network 430 (whether illustrated or not), or a combination of the Computer 402 and another component. Memory 407 can store any data consistent with the present disclosure. In some implementations, Memory 407 can be a combination of two or more different types of memory (for example, a combination of semiconductor and magnetic storage) according to particular needs, desires, or particular implementations of the Computer 402 and the described functionality. Although illustrated as a single Memory 407, two or more Memories 407 or similar or differing types can be used according to particular needs, desires, or particular implementations of the Computer 402 and the described functionality. While Memory 407 is illustrated as an integral component of the Computer 402, in alternative implementations, Memory 407 can be external to the Computer 402.

The Application 408 is an algorithmic software engine providing functionality according to particular needs, desires, or particular implementations of the Computer 402, particularly with respect to functionality described in the present disclosure. For example, Application 408 can serve as one or more components, modules, or applications. Further, although illustrated as a single Application 408, the Application 408 can be implemented as multiple Applications 408 on the Computer 402. In addition, although illustrated as integral to the Computer 402, in alternative implementations, the Application 408 can be external to the Computer 402.

The Computer 402 can also include a Power Supply 414. The Power Supply 414 can include a rechargeable or non-rechargeable battery that can be configured to be either user- or non-user-replaceable. In some implementations, the Power Supply 414 can include power-conversion or management circuits (including recharging, standby, or another power management functionality). In some implementations, the Power Supply 414 can include a power plug to allow the Computer 402 to be plugged into a wall socket or another power source to, for example, power the Computer 402 or recharge a rechargeable battery.

There can be any number of Computers 402 associated with, or external to, a computer system containing Computer 402, each Computer 402 communicating over Network 430. Further, the term "client," "user," or other appropriate terminology can be used interchangeably, as appropriate, without departing from the scope of the present disclosure. Moreover, the present disclosure contemplates that many users can use one Computer 402, or that one user can use multiple computers 402.

Described implementations of the subject matter can include one or more features, alone or in combination.

For example, in a first implementation, a computer-implemented method, including receiving, at a machine learning (ML) decentralized application (DAPP) platform, a request for an inference from a customer, wherein the request includes a data record associated with a user that is associated with the customer; distributing, by the ML DAPP platform, the data record among a number of service providers; receiving, at the ML DAPP platform, an inference from each service provider; and returning, by the ML DAPP platform, the received inferences to the customer.

The foregoing and other described implementations can each, optionally, include one or more of the following features:

A first feature, combinable with any of the following features, wherein each service provider is in an underutilized state.

A second feature, combinable with any of the previous or following features, further including prior to receiving a request for an interference from the customer, triggering, by the user, a triggering event.

A third feature, combinable with any of the previous or following features, further including presenting, by the customer and to the user, a personalized offering that is based on the returned inferences.

A fourth feature, combinable with any of the previous or following features, further including prior to distributing the data record: sending, by the ML DAPP platform, an inference quote to the customer, wherein the inference quote is made by evaluating the received database; and receiving, at the ML DAPP platform, an acceptance of the inference quote from the customer if the customer accepts the inference quote.

A fifth feature, combinable with any of the previous or following features, wherein the number of service providers belong to a network of devices.

A sixth feature, combinable with any of the previous or following features, wherein each service provider is registered at a ML model repository, and wherein each registered service provider is loaded with a ML model received from the ML model repository.

A seventh feature, combinable with any of the previous or following features, further including in response to receiving a result from service providers, sending, from the ML DAPP platform and to the network of devices, a request for assigning a token to each service provider.

A eighth feature, combinable with any of the previous or following features, wherein each inference is generated by the service provider executing the data record using the received ML model.

A ninth feature, combinable with any of the previous or following features, further including sending, by the ML DAPP platform, the inferences to the ML model repository, wherein the inferences are used to train models stored in the ML model repository.

A tenth feature, combinable with any of the previous or following features, wherein the received request further includes a customer-defined model, wherein the data record is distributed to the service providers in separate data batches, and wherein the customer-defined model is trained on each service provider using each data batch.

A eleventh feature, combinable with any of the previous or following features, wherein each service provider is in an underutilized state and is ready to accept tasks from the ML DAPP platform.

In a second implementation, a non-transitory, computer-readable medium storing one or more instructions executable by a computer system to perform operations including receiving, at a machine learning (ML) decentralized application (DAPP) platform, a request for an inference from a customer, wherein the request includes a data record associated with a user that is associated with the customer; distributing, by the ML DAPP platform, the data record among a number of service providers; receiving, at the ML DAPP platform, an inference from each service provider; and returning, by the ML DAPP platform, the received inferences to the customer.

The foregoing and other described implementations can each, optionally, include one or more of the following features:

A first feature, combinable with any of the following features, wherein each service provider is in an underutilized state.

A second feature, combinable with any of the previous or following features, further including prior to receiving a request for an interference from the customer, triggering, by the user, a triggering event.

A third feature, combinable with any of the previous or following features, further including presenting, by the customer and to the user, a personalized offering that is based on the returned inferences.

A fourth feature, combinable with any of the previous or following features, further including prior to distributing the data record: sending, by the ML DAPP platform, an inference quote to the customer, wherein the inference quote is made by evaluating the received database; and receiving, at the ML DAPP platform, an acceptance of the inference quote from the customer if the customer accepts the inference quote.

A fifth feature, combinable with any of the previous or following features, wherein the number of service providers belong to a network of devices.

A sixth feature, combinable with any of the previous or following features, wherein each service provider is registered at a ML model repository, and wherein each registered service provider is loaded with a ML model received from the ML model repository.

A seventh feature, combinable with any of the previous or following features, further including in response to receiving a result from service providers, sending, from the ML DAPP platform and to the network of devices, a request for assigning a token to each service provider.

A eighth feature, combinable with any of the previous or following features, wherein each inference is generated by the service provider executing the data record using the received ML model.

A ninth feature, combinable with any of the previous or following features, further including sending, by the ML DAPP platform, the inferences to the ML model repository, wherein the inferences are used to train models stored in the ML model repository.

A tenth feature, combinable with any of the previous or following features, wherein the received request further includes a customer-defined model, wherein the data record is distributed to the service providers in separate data batches, and wherein the customer-defined model is trained on each service provider using each data batch.

A eleventh feature, combinable with any of the previous or following features, wherein each service provider is in an underutilized state and is ready to accept tasks from the ML DAPP platform.

In a third implementation, a computer-implemented system, comprising, one or more computers; and one or more computer memory devices interoperably coupled with the one or more computers and having tangible, non-transitory, machine-readable media storing one or more instructions that, when executed by the one or more computers, perform one or more operations including receiving, at a machine learning (ML) decentralized application (DAPP) platform, a request for an inference from a customer, wherein the request includes a data record associated with a user that is associated with the customer; distributing, by the ML DAPP platform, the data record among a number of service providers; receiving, at the ML DAPP platform, an inference from each service provider; and returning, by the ML DAPP platform, the received inferences to the customer.

The foregoing and other described implementations can each, optionally, include one or more of the following features:

A first feature, combinable with any of the following features, wherein each service provider is in an underutilized state.

A second feature, combinable with any of the previous or following features, further including prior to receiving a request for an interference from the customer, triggering, by the user, a triggering event.

A third feature, combinable with any of the previous or following features, further including presenting, by the customer and to the user, a personalized offering that is based on the returned inferences.

A fourth feature, combinable with any of the previous or following features, further including prior to distributing the data record: sending, by the ML DAPP platform, an inference quote to the customer, wherein the inference quote is made by evaluating the received database; and receiving, at the ML DAPP platform, an acceptance of the inference quote from the customer if the customer accepts the inference quote.

A fifth feature, combinable with any of the previous or following features, wherein the number of service providers belong to a network of devices.

A sixth feature, combinable with any of the previous or following features, wherein each service provider is registered at a ML model repository, and wherein each registered service provider is loaded with a ML model received from the ML model repository.

A seventh feature, combinable with any of the previous or following features, further including in response to receiving a result from service providers, sending, from the ML DAPP platform and to the network of devices, a request for assigning a token to each service provider.

A eighth feature, combinable with any of the previous or following features, wherein each inference is generated by the service provider executing the data record using the received ML model.

A ninth feature, combinable with any of the previous or following features, further including sending, by the ML DAPP platform, the inferences to the ML model repository, wherein the inferences are used to train models stored in the ML model repository.

A tenth feature, combinable with any of the previous or following features, wherein the received request further includes a customer-defined model, wherein the data record is distributed to the service providers in separate data batches, and wherein the customer-defined model is trained on each service provider using each data batch.

A eleventh feature, combinable with any of the previous or following features, wherein each service provider is in an underutilized state and is ready to accept tasks from the ML DAPP platform.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware and encompass all kinds of apparatuses, devices, and machines for processing data, including by way of example, a programmable processor, a computer, or multiple processors or computers. The computer can also be, or further include special-purpose logic circuitry, for example, a central processing unit (CPU), a field programmable gate array (FPGA), or an application-specific integrated circuit (ASIC). In some implementations, the computer or computer-implemented system or special-purpose logic circuitry (or a combination of the computer or computer-implemented system and special-purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system, for example LINUX, UNIX, WINDOWS, MAC OS, ANDROID, or IOS, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special-purpose logic circuitry, for example, a CPU, an FPGA, or an ASIC.

Computers for the execution of a computer program can be based on general or special-purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/–R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special-purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity or a multi-touch screen using capacitive or electric sensing. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, frame relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
   receiving, at a machine learning (ML) decentralized application (DAPP) platform, a request for an inference from a customer, wherein the request comprises a data record associated with a user that is associated with the customer, the data record comprising historical responses of the user to past inferences;
   distributing, by the ML DAPP platform, the data record among a plurality of service providers;
   receiving, at the ML DAPP platform, inferences from the plurality of service providers, wherein a respective inference received from a respective service provider comprises a prediction of services of interest for the user that are offered by a provider; and
   returning, by the ML DAPP platform, the inferences to the customer.

2. The computer-implemented method of claim 1, wherein each service provider is in an underutilized state.

3. The computer-implemented method of claim 1, further comprising:
   prior to receiving a request for an interference from the customer, triggering, by the user, a triggering event.

4. The computer-implemented method of claim 3, further comprising:
   presenting, by the customer and to the user, a personalized offering that is based on the inferences.

5. The computer-implemented method of claim 1, further comprising:

prior to distributing the data record:
sending, by the ML DAPP platform, an inference quote to the customer, wherein the inference quote is made by evaluating the data record and
receiving, at the ML DAPP platform, an acceptance of the inference quote from the customer if the customer accepts the inference quote.

6. The computer-implemented method of claim 1, wherein the plurality of service providers belong to a network of devices.

7. The computer-implemented method of claim 6, wherein each service provider is registered at a ML model repository, and wherein each registered service provider is loaded with a ML model received from the ML model repository.

8. The computer-implemented method of claim 7, further comprising:
in response to receiving a result from service providers, sending, from the ML DAPP platform and to the network of devices, a request for assigning a token to each service provider.

9. The computer-implemented method of claim 7, wherein each inference is generated by the service provider executing the data record using the ML model.

10. The computer-implemented method of claim 7, further comprising:
sending, by the ML DAPP platform, the inferences to the ML model repository, wherein the inferences are used to train models stored in the ML model repository.

11. The computer-implemented method of claim 1, wherein the request further comprises a customer-defined model, wherein the data record is distributed to the service providers in separate data batches, and wherein the customer-defined model is trained on each service provider using each data batch.

12. The computer-implemented method of claim 11, wherein each service provider is in an underutilized state and is ready to accept tasks from the ML DAPP platform.

13. A non-transitory, computer-readable medium storing one or more instructions executable by a computer system to perform operations comprising:
receiving, at a machine learning (ML) decentralized application (DAPP) platform, a request for an inference from a customer, wherein the request comprises a data record associated with a user that is associated with the customer, the data record comprising historical responses of the user to past inferences;
distributing, by the ML DAPP platform, the data record among a plurality of service providers;
receiving, at the ML DAPP platform, inferences from the plurality of service providers, wherein a respective inference received from a respective service provider comprises a prediction of services of interest for the user that are offered by a provider; and
returning, by the ML DAPP platform, the inferences to the customer.

14. The non-transitory, computer-readable medium of claim 13, wherein each service provider is in an underutilized state.

15. The non-transitory, computer-readable medium of claim 13, further comprising:
presenting, by the customer and to the user, a personalized offering that is based on the inferences.

16. The non-transitory, computer-readable medium of claim 13, wherein the plurality of service providers belong to a network of devices.

17. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
receiving, at a machine learning (ML) decentralized application (DAPP) platform, a request for an inference from a customer, wherein the request comprises a data record associated with a user that is associated with the customer, the data record comprising historical responses of the user to past inferences;
distributing, by the ML DAPP platform, the data record among a plurality of service providers;
receiving, at the ML DAPP platform, inferences from the plurality of service providers, wherein a respective inference received from a respective service provider comprises a prediction of services of interest for the user that are offered by a provider; and
returning, by the ML DAPP platform, the inferences to the customer.

18. The computer-implemented system of claim 17, wherein each service provider is in an underutilized state.

19. The computer-implemented system of claim 17, further comprising:
presenting, by the customer and to the user, a personalized offering that is based on the inferences.

20. The computer-implemented system of claim 17, wherein the plurality of service providers belong to a network of devices.

* * * * *